UNITED STATES PATENT OFFICE.

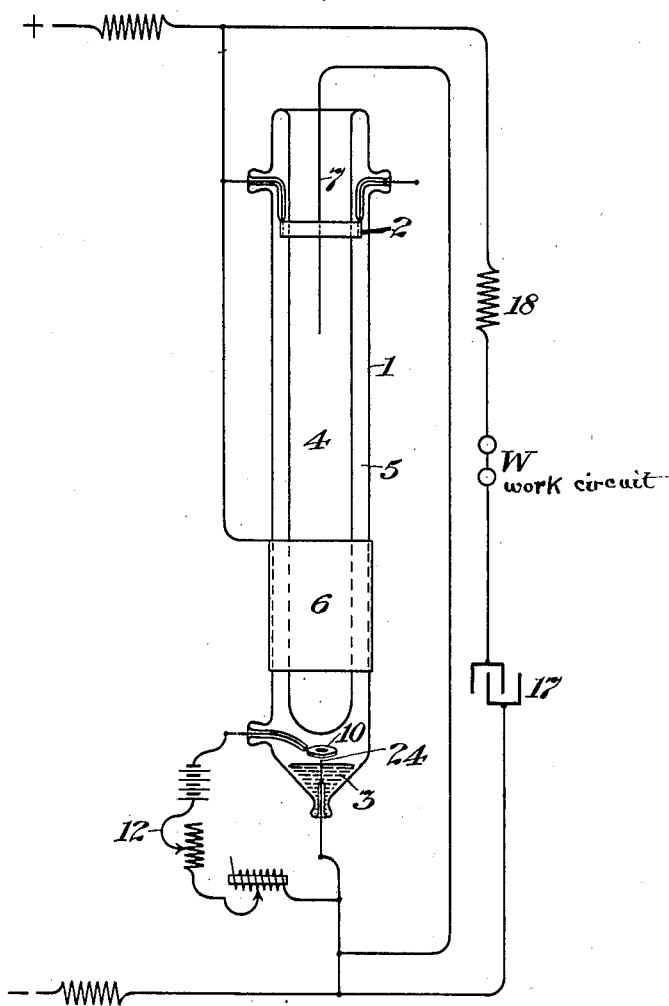

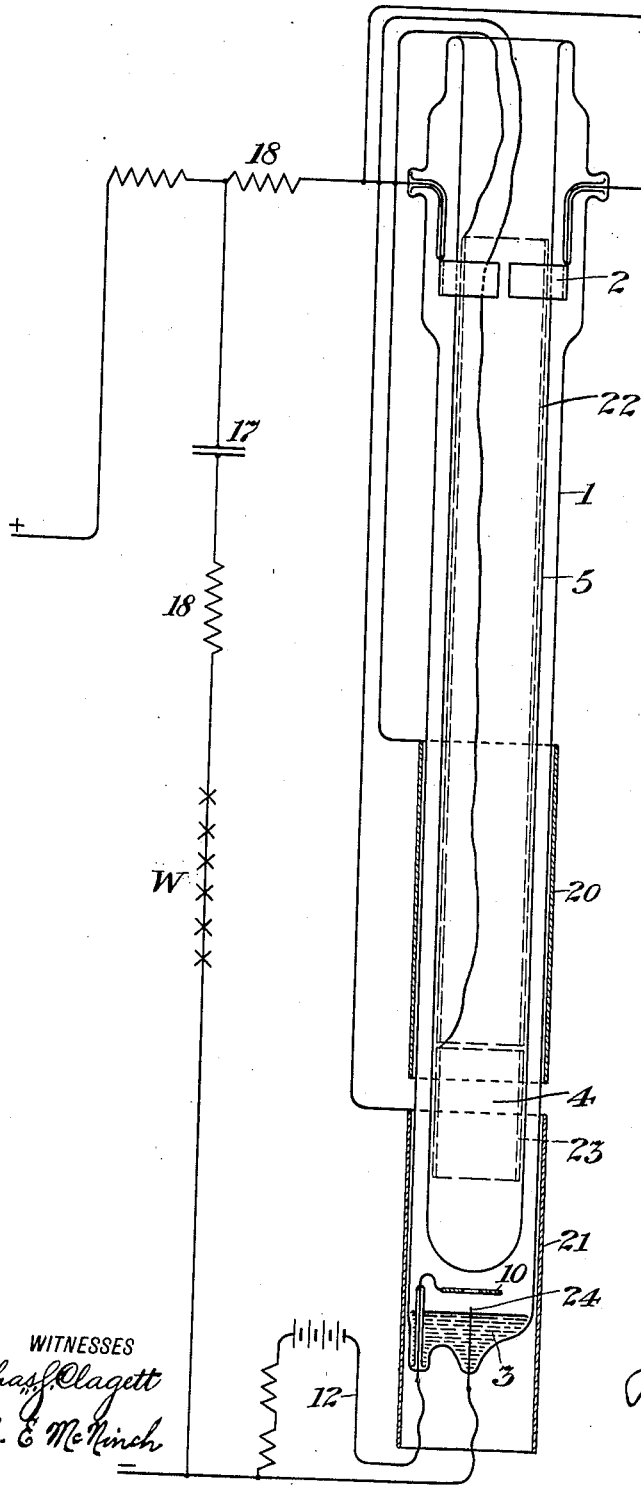

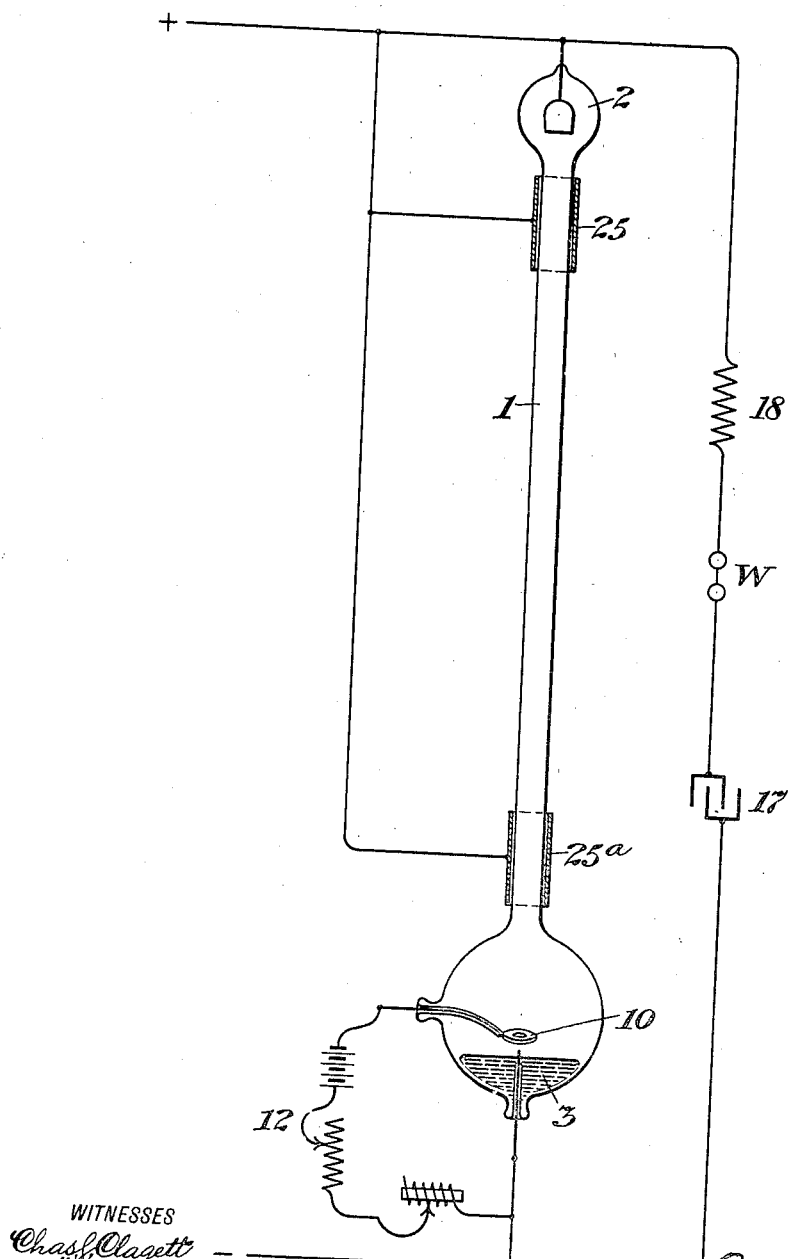

PETER COOPER HEWITT, OF RINGWOOD MANOR, NEW JERSEY.

MEANS FOR PRODUCING PERIODIC OR ALTERNATING CURRENTS AND CONTROLLING THE FREQUENCY OF THE SAME.

1,321,437. Specification of Letters Patent. Patented Nov. 11, 1919.

Application filed May 12, 1914. Serial No. 838,037.

*To all whom it may concern:*

Be it known that I, PETER COOPER HEWITT, a citizen of the United States, residing at Ringwood Manor, in the county of Passaic and State of New Jersey, have invented certain new and useful Improvements in Means for Producing Periodic or Alternating Currents and Controlling the Frequency of the Same, of which the following is a specification.

My present invention relates to methods of and means for producing periodic or alternating currents and controlling the frequency of the same.

I have discovered that the ability of a gas or vapor tube which is kept constantly "alive" or in an "ionized" condition, as it is called, to produce, in connection with a circuit containing inductance and capacity, high frequency periodic or alternating currents is greatly augmented by subjecting the space between the electrodes to the influence of a body statically charged or possessing capacity, and that the frequency of such currents, or other characteristics, may be readily varied thereby. In other words, I have discovered that, if a body having capacity, is located in the neighborhood of the stream of current flowing through such a tube, not only will the tube perform its functions as a frequency producer, but the rate of oscillation; and other characteristics, of the current may be readily changed within wide limits. I have further discovered that the characteristics of the current can be definitely changed by definite changes in the size, location or proximity of said capacity device or devices, and by definitely determining or definitely changing the polarity of said capacity device or devices.

In the accompanying drawings:

Figure 1 shows an arrangement embodying my present invention.

Figs. 2 and 3 show other arrangements embodying my present invention.

Referring to the drawings:

1 is a mercury vapor tube. 2 is the main positive electrode and 3 the negative electrode. 10 is an auxiliary or "keep alive" electrode included in an independent circuit 12 having a wire 24 extending above the surface of the mercury to anchor the active point. The tube has a reëntrant portion 4 forming an annular space 5 for the current flow. 17 is a condenser, 18 an inductance, and W indicates the work circuit. 6 is a cylinder of metal, or other body having capacity, surrounding the tube near the negative electrode and connected with the positive lead. 7 is a wire, or other body having capacity, located near the positive electrode and connected to the negative lead.

I have succeeded in keeping a mercury tube of the form shown in the drawings, in such system as is there shown, in continued operation as an oscillation producer when all static or other extraneous effects were removed. But, when a body or shield having capacity is placed in the neighborhood of the tube, it is easy to start and maintain such tube in operation as an oscillation producer. Besides, the rate of oscillation, and other characteristics of the current, may be widely changed by causing such body to approach toward or recede from the tube, or by moving such body up or down the tube, or by increasing the capacity of such body, or by subjecting the space between the electrodes to the effect of another body having capacity. Similar effects are produced if an insulated metal rod be moved up and down the reëntrant space within the tube, or if a rod connected with the main line be moved up and down, or if the capacity of said rod is increased by touching said rod.

My discoveries may be embodied in a great variety of forms, one of which is shown in Fig. 1 of the drawings. Here a capacity device 6 in the form of a metal cylinder is shown surrounding the tube near the negative electrode and this is connected with the positive lead. Also a capacity device in the form of a rod or wire located in the reëntrant portion of the tube near the positive end is shown attached to the negative lead. In such a device, by making and breaking contact between a body having capacity (such as the earth, for example) and the metal cylinder 6, the rate of oscillation may be changed from one definite time period to another definite time period. Any other suitable means may be used to impress on the current stream the influence of neighboring capacity, or to increase or decrease such influence. In Fig. 2 there are located two metal tubes 20 and 21 on the outside connected with the positive lead and two metal tubes 22 and 23 located in the reëntrant portion also connected with the positive lead. In Fig. 3 a plain cylindrical tube of relatively small diameter is shown, having capacity bands or cylinders surrounding the same, both connected to the positive lead.

While I have shown herein only mercury vapor tubes, it will be understood that any other analogous gas, or vapor, or evacuated tube may be employed.

Since the gas or vapor tube is constantly kept alive; or, in other words, since the negative electrode is constantly kept in active condition; it is evident that the desired oscillations are produced by the reactions at the positive electrode or in the gas or vapor path, or both. In other words, the reactions availed of are those which relate to the starting of current flow in a tube which is constantly kept alive, or in which the negative electrode resistance to starting is annulled or kept at a low value. These reactions are variously influenced by the surrounding and internal conditions of static charge or capacity and may be made either to increase or decrease the normal resistance to starting. Changes of these conditions bring about changes in the action of the device and, in this way, its action is, or may be, controlled and made definite. It is evident that a proper coördination of the action of these forces will contribute to bring about the most uniform action and, having established such coördination, any desired arrangement thereof may serve as a useful agent of control, when such control is desirable.

The term "gas or vapor tube" as used in these specifications and in the claims is intended to include all forms of devices which are the equivalent of a mercury tube for the purposes of this invention, irrespective of the contents of the tube (if it be a tube), and irrespective of the means employed to keep the negative electrode alive, or to keep the resistance to starting at the negative electrode at a low value. The term, therefore, as used may include, for example, a tube exhausted to any degree, or a suitable current flow in air or other gas, and may include a device in which the negative electrode is kept constantly alive, or in which the resistance to starting at the negative electrode is maintained at a low value, by being highly heated; and may include any path between electrodes controlled mechanically or electrically, where the resistance to starting at the negative electrode is maintained at a low value.

What I claim and desire to secure by Letters Patent of the United States is:—

1. The combination with a gas or vapor device, of means for establishing periodic current flow therethrough, and means for modifying such flow comprising independent capacity sources located respectively in proximity to the positive and negative electrodes and respectively connected electrically with the leads to the remote electrodes.

2. The combination with a gas or vapor device for producing periodic currents, of means for augmenting the normal characteristics thereof consisting of an electrical conductor located adjacent to the current path between the electrodes of the device and adjustable along the length of said current path.

3. The combination with a gas or vapor device and means for sustaining periodic or rapidly varying current flow therethrough, of an intensifying device comprising an element having electrical capacity located in proximity to the current path and receiving charges of opposite sign from that of the adjacent electrode.

4. The method of controlling the rate of current variation in an electric circuit including a gas or vapor device of the character described producing periodic currents, which consists in impressing upon the gas or vapor path a field of force, and independently changing said force coincidently with changes in the potential difference at the terminals of the device.

5. The method of controlling the rate of current variation in an electric circuit including a gas or vapor device of the character described producing periodic currents, which consists in creating variations in said circuit, impressing upon the gas or vapor path a field of force from without the gas or vapor path, and changing such force coincidently with changes in the device.

6. The combination with a suitable source of current of a condenser, and a gas or vapor tube connected in parallel, and means for impressing capacity effects on the tube between the electrodes, said means comprising independent conductors located between the positive and negative ends of the tube, and connected to the current supply.

7. The combination with a suitable source of current of a condenser and a gas or vapor tube connected in parallel, and an external element having electrical capacity attached to the negative lead and located near the positive end of the tube.

8. The combination with a suitable source of current of a condenser and a gas or vapor tube connected in parallel, and an external element having electrical capacity attached to the positive lead and located near the negative end of the tube, and a conducting substance attached to negative lead and located near the positive end of the tube.

9. The combination with a gas or vapor device for producing periodic currents, of means for augmenting the normal characteristics thereof, consisting of an electrical conductor located adjacent to the current path between the electrodes of the device and electrically connected in the system of the gas or vapor device.

10. The combination with a gas or vapor device having a constantly active cathode, of means for establishing periodic current flow therethrough, and means for modifying such flow comprising independent capacity sources located respectively in proximity to the positive and negative electrodes and respectively connected electrically with the leads to the remote electrodes.

11. The combination with a gas or vapor device having a constantly active cathode and for producing periodic currents, of means for augmenting the normal characteristics thereof, consisting of an electrical conductor located adjacent to the current path between the electrodes of the device and electrically connected in the system of the gas or vapor device.

12. The combination with a gas or vapor device having a constantly active cathode and means for producing periodic currents, of means for augmenting the normal characteristics thereof, consisting of an external element having electrical capacity located adjacent to the current path between the electrodes of the device.

In testimony whereof I have hereunto signed my name in the presence of two subscribing witnesses.

PETER COOPER HEWITT.

Witnesses:
 L. A. COLEMAN,
 R. A. HEWITT.